June 29, 1965  A. F. VINAL  3,192,071
DRY CELL ELECTRODES CONTAINING FIBROUS GRAPHITE
AND PROCESS OF MAKING SAME
Filed Dec. 27, 1960

INVENTOR
ALBERT F. VINAL
BY
ATTORNEY

United States Patent Office 3,192,071
Patented June 29, 1965

3,192,071
DRY CELL ELECTRODES CONTAINING FIBROUS GRAPHITE AND PROCESS OF MAKING SAME
Albert F. Vinal, Shaker Heights, Ohio, assignor to Union Carbide Corporation, a corporation of New York
Filed Dec. 27, 1960, Ser. No. 78,734
7 Claims. (Cl. 136—121)

This invention relates to cell electrodes bonded with a fibrous graphite binder and to a method for making the same.

Fibrous materials previously suggested as additives to cell electrode mixes generally have fallen into two categories: materials, such as steel wool or other metal wools, or fibers which are electrically conductive but reactive in some cell environments; and materials, such as asbestos, which may be inert under most conditions, but are not electrically conductive.

As an example of prior art practice in this field, steel wool, a conductive material, has been proposed as an additive in cathodes intended for use in alkaline cells. In an alkaline environment, use of steel wool is possible because of its inertness to alkali. Steel wool, however, can not be used in an acid system where it corrodes, gasses and causes ultimate failure of the cell.

Non-conductive inert materials such as asbestos have also been suggested. These certainly do not tend to increase the conductivity of the electrode but, in fact, lessen it to a degree.

It is therefore the object of this invention to utilize a newly developed fibrous material in the construction of high rate battery electrodes, thereby making them stronger and more useful.

By incorporating graphite fibers, wool, or cloth into electrodes, which are formed by molding highly comminuted materials, it is possible to greatly increase the resistance of such electrodes to cracking, spalling, and flaking. The advantages of the subject discovery are especially noticeable in thin plate electrodes for use in high rate deferred action or reserve cells, where the electrode is allowed to dry completely after molding.

In distinguishing the subject invention over the prior art, it is noteworthy to observe that the graphite fibers used herein are not only highly conductive but also, chemically inert.

Figure 1:
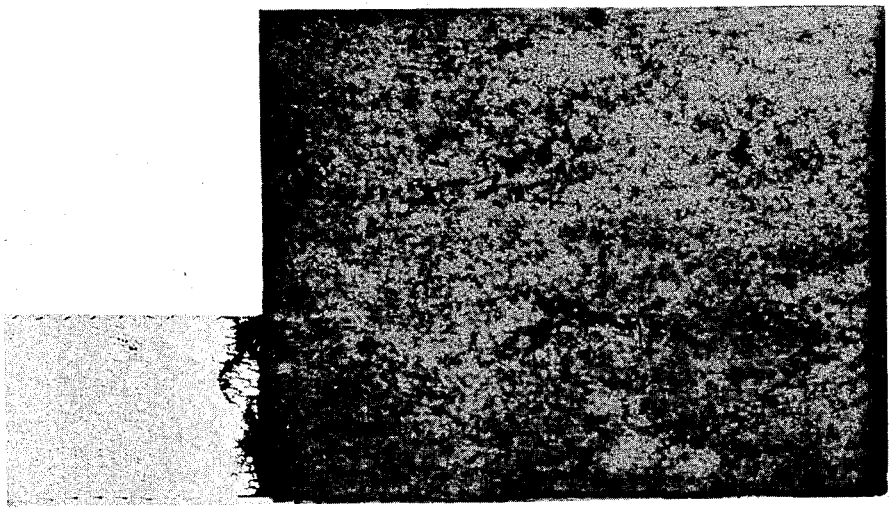
Figure 2:
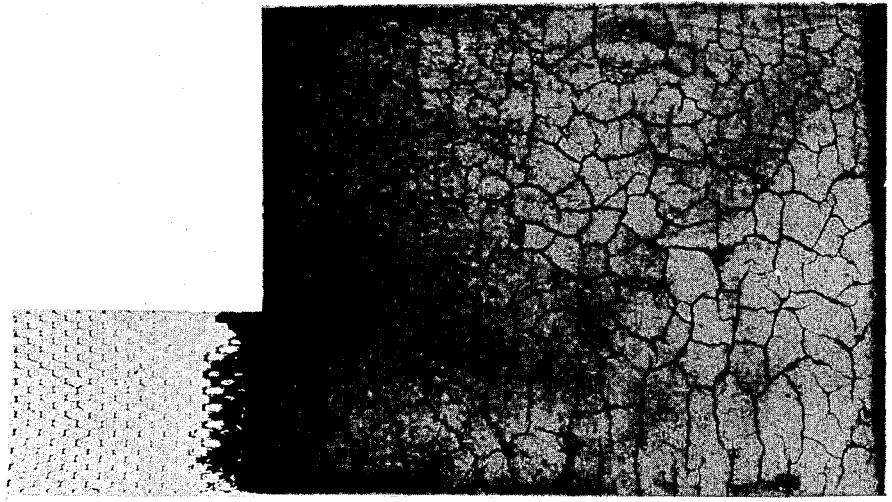

In the drawings, FIGURE 1 is a photograph of a cathode fabricated according to the teachings of the present invention and FIGURE 2 is the same for an electrode made without the binders of the invention.

The cathodes of the present invention comprise oxidic, organic depolarizers or inorganic depolarizers containing no oxygen; a carbonaceous conductive material; and, from about 1 to about 5 percent by weight thereof of graphite fibers, which constitute a substantially continuous matrix for the other cathode constituents. In the preferred embodiment of the invention, a mix containing the above constituents is compressed against a suitable support such as an expanded metallic grid which, to avoid the possibility of a reaction with acid electrolyte, should be carbon-coated. The broad range of constituents, in addition to the 1 to 5 percent by weight of fibrous graphite is 60 to 80 parts by weight of depolarizing material and 20 to 40 parts by weight of conductive carbon particles.

Preferably, the graphite fibers used as the binder herein consist of chopped graphite cloth made according to a recent process which is not part of the present invention. Briefly stated, this process comprises subjecting cellulosic cloth or yarn such as rayon or viscose rayon to a carefully controlled heating schedule until graphitization has taken place. The preferred heating schedule comprises a slow heating stage at temperatures ranging from about 100° C. to about 300° C. at a rate of increase of from about 10° C. per hour to about 50° C. per hour, followed by a second heating stage from about 300° C. to 400° C. which is conducted at approximately the same rate or at a 5 to 10 percent faster rate. From 400° C. to about 900° C. heating rates of up to 100° C. rise per hour are employed. From 900° C. to about 3000° C. rapid heating rates up to 3000° C. per hour may be employed. The cellulosic material is preferably positioned in a suitable protective enclosure while passing through the above-described ranges. For example, a metal sagger may be employed while passing through the room temperature to 900° C. range and a graphite capsule is suitable for the 900° C. to 3000° C. range. A protective atmosphere of nitrogen or other inert gases is desirable when passing through the 900° C. to 3000° C. range. Each filament of the graphite fibers obtained by the above-described process has a diameter in the range of about 5 to about 25 microns, a tensile strength in excess of 40,000 pounds per square inch and a specific resistance of from 1800 and 5500 micro-ohm centimeters.

The present inventive concept finds most advantageous application in the construction of electrodes, especially cathodes, for high rate cells utilizing polyhalogen organic or inorganic depolarizers such as those described in the copending application of J. S. Dereska et al., Ser. No. 40,886, filed July 5, 1960, now U.S. Patent No. 3,057,760, issued on October 9, 1962.

Such depolarizers may be polyhalide salts consisting of a cation having an atomic radius equal to that of potassium and an anion containing an odd number of halogen atoms or halide complexes having a point of high electron density and a polyhalogen electron acceptor. Representative inorganic polyhalides are potassium dichloroiodide, cesium nonaiodide and rubidium iodobromochloride. Representative organic polyhalides are the alkyl ammonium compounds such as tetramethyl ammonium pentaiodide and S-butylammonium dibromoiodide. Also operative are compounds such as tetramethyl phosphonium dichloroiodide, trimethyl ethyl phosphonium and trimethyl sulfonium chlorobromoiodide.

In a first example illustrative of the invention a cathode for a deferred action cell was made. This cathode was prepared from a mix consisting of 19 grams of acetylene black and 1 gram of chopped graphite fibers. These fibers were prepared by chopping graphite cloth, obtained as above-described, in a high speed mixer to lengths ranging from $1/32$ inch to $1/4$ inch. To this mixture was added 80 grams of an organic depolarizer, pyrazole di-dichlorobromide, and all of the ingredients again were intimately mixed. Fifteen grams of the resulting dry mix was placed on a carbon-coated expanded metal grid and were preliminarily pressed to form a flat plate. Enough water was then sprayed onto the plate to dampen the mix. For this purpose, a solution of ethyl silicate in alcohol also can be used. The plate was then molded at 250 pounds per square inch. The finished cathode measured $2 7/8$ by $3 9/16$ by 0.063 inch.

As is well known in the art, deferred action cells contain no electrolyte until they are put in service so that it often occurs that their cathodes dry out and crack while awaiting use. This unwanted result of prolonged storage is eliminated by the present invention as strikingly evidenced by the accompanying drawing. FIGURE 1 shows photographically the cathode prepared in the above example. Its appearance should be contrasted with that of the electrode also shown photographically on FIGURE 2.

The electrode shown on FIGURE 2 was stored for the same period of time as the electrode shown on FIGURE 1 and was made in precisely the same way except that no graphite fibers were added to the mix used to prepare the electrode of FIGURE 2. It is clear from FIGURE 2 that the electrode shown therein has dried out completely and cracked extensively over its entire area during storage. No such flaws appear in the electrode of the invention shown on FIGURE 1.

In the following examples, mixes were made using in each example, 19 grams of acetylene black, 1 gram of chopped graphite fibers and 80 grams of the following organic depolarizers:

| Cathode mix number: | Organic depolarizer |
| --- | --- |
| 1 | Pyridiniumdichlorobromide. |
| 2 | Monomethylammonium tetrachloroiodide. |
| 3 | Pyridiniumtetrachloroiodide. |

Fifteen grams of each mix were used to make flat cathodes, as previously described. These cathodes had an area of about 10.2 square inches and were incorporated in deferred action cells employing anodes of the same area, which consisted of powdered zinc supported by a metal grid. A matte of plastic was used as the separator and the electrolyte consisted of a calcium chloride electrolyte of the type used for low temperature cell operation. The resulting cells were tested for operativeness. The variation in voltage over the first 8.5 minutes of operation was noted and calculated in percent of the total operating voltage. In these tests, a fixed resistance external load of 0.15 ohm was employed at room temperature. This data appears in Table I below:

Table I

| Cathode Mix Number | Initial Voltage | | Voltage Regulation, percent | Initial Current Density, ma./sq. in. |
| --- | --- | --- | --- | --- |
| | Open Circuit | Closed Circuit | | |
| 1 | 2.09 | 1.75 | ±18.2 | 1,000 |
| 2 | 2.09 | 1.20 | ±4.8 | 777 |
| 3 | 1.96 | 1.10 | ±1.9 | 701 |

In an acid environment such as that of the cells above-tested, the use of steel wool in the cell cathodes is impractical because of the steel's reactivity. By contrast, no reaction is possible between the electrolyte and the graphite fibers.

Cathodes made in accordance with this invention also may be used in gas depolarized cells such as the one described in U.S. Patent No. 2,914,595, W. G. Darland, Jr., et al. In the chlorine-depolarized deferred action cell disclosed therein, the converter-depolarizer member is made of a mixture of activated carbon and of non-conductive fibrous-conductive agents which is pressed into a flat disc. The substitution in this member, of graphite fibers or wool for these conductive agents provides the required strength without sacrificing conductivity. Fibrous graphite may also be employed to advantage in the diffuser element used in such cells. The fibers' inertness to the strongly acid electrolyte used therein makes them ideal for that system.

The fiber-bonded cathodes of the subject invention may be used in alkaline environment such as that of the alkaline, zinc-manganese dioxide system. Where the cathodes are intended for use in a system containing an acid electrolyte, it has been found necessary to render the support grid inert to such electrolyte. Any suitable technique for so doing may be employed. The preferred method of achieving current collector inertness, however, is to coat the grid collector with a conductive dispersion of acetylene black and powdered graphite in a resin-solvent vehicle.

Suitable resin-carbon mixtures for placing conductive coatings on metallic elements are disclosed in U.S. Patent No. 2,408,416. Other useful formulations disclosed in "Canadian Chemistry and Process Industries," August 1945, are:

(1)

| Butvar (the butyral of polyvinyl alcohol) | 100 parts. |
| --- | --- |
| Acetylene black | 50 parts. |
| Methanol and acetone (1:1) | To desired viscosity. | and (2)

| Phenol formaldehyde (Amberlite PR-14) | 100 parts. |
| --- | --- |
| Acetylene black | 50 parts. |
| Methanol and acetone (1:1) | To desired viscosity. |

What is claimed is:

1. A cell electrode comprising from about 20 to about 40 parts by weight of comminuted carbonaceous particles, from about 60 to about 80 parts by weight of finely divided depolarizing particles and from about 1 to about 5 percent by weight of graphite fibers based on the weight of the depolarizer and carbonaceous particles, the filaments of said fibers having a diameter in the range of about 5 to about 25 microns, a tensile strength in excess of 40,000 pounds per square inch and a specific resistance ranging from about 1800 to about 5500 micro-ohm-centimeters, said fibers constituting a substantially continuous matrix for said depolarizing and carbonaceous particles.

2. The electrode of claim 1, wherein said depolarizing particles consist of an inorganic polyhalide.

3. The electrode of claim 1, wherein said depolarizing particles consist of an organic polyhalide.

4. The electrode of claim 1, additionally characterized by the presence therein of an expanded metal grid.

5. The electrode of claim 1, additionally characterized by the presence therein of a carbon-coated metal grid.

6. The electrode of claim 1, wherein said graphite fibers range in length from about 1/32 inch to about 1/4 inch.

7. A method for manufacturing electrodes comprising forming a dry mix containing from 60 to 80 parts by weight of a depolarizer, from about 20 to about 40 parts by weight of conductive carbon particles and from about 1 to about 5 percent by weight of graphite fibers based on the depolarizer-carbon mixture, compressing said mix onto a support, moistening the resulting flat plate and re-compressing said moistened plate.

References Cited by the Examiner

UNITED STATES PATENTS

| Re. 24,408 | 12/57 | Hack et al. | 136—153 |
| --- | --- | --- | --- |
| 2,453,440 | 11/48 | Kaufmann et al. | 23—209.4 |
| 2,475,282 | 7/49 | Hasche | 23—209.4 |
| 2,977,401 | 3/61 | Marsal et al. | 136—120 |
| 3,060,254 | 10/62 | Urry | 136—120 |
| 3,071,637 | 1/63 | Horn et al. | 136—122 |
| 3,072,558 | 1/63 | Myers et al. | 204—280 |

FOREIGN PATENTS

| 1,597 | 1891 | Great Britain. |
| --- | --- | --- |
| 365,754 | 1/32 | Great Britain. |

WINSTON A. DOUGLAS, Primary Examiner.

JOHN R. SPECK, JOHN H. MACK, Examiners.